(12) United States Patent
Deshpande et al.

(10) Patent No.: US 11,790,149 B1
(45) Date of Patent: Oct. 17, 2023

(54) SYSTEM AND METHOD FOR TRACING NETS ACROSS MULTIPLE FABRICS IN AN ELECTRONIC DESIGN

(71) Applicant: Cadence Design Systems, Inc., San Jose, CA (US)

(72) Inventors: Devendra Ramakant Deshpande, Noida (IN); Arnold Jean Marie Gustave Ginetti, Antibes (FR); Fabien Campana, Les Adrets de l'Esterel (FR); Harpreet Singh, Noida (IN); Tapan Kumar Singh, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 49 days.

(21) Appl. No.: 17/496,660

(22) Filed: Oct. 7, 2021

(51) Int. Cl.
*G06F 30/398* (2020.01)
*G06F 30/12* (2020.01)
*G06F 30/31* (2020.01)
*G06F 30/392* (2020.01)
*G06F 30/394* (2020.01)
*G06F 111/02* (2020.01)

(52) U.S. Cl.
CPC ............ *G06F 30/398* (2020.01); *G06F 30/12* (2020.01); *G06F 30/31* (2020.01); *G06F 30/392* (2020.01); *G06F 30/394* (2020.01); *G06F 2111/02* (2020.01)

(58) Field of Classification Search
CPC ...................................................... G06F 30/398
USPC ......................................................... 716/139
See application file for complete search history.

(56) References Cited

U.S. PATENT DOCUMENTS

| 9,223,915 B1 * | 12/2015 | Ginetti | G06F 30/367 |
| 10,423,750 B1 * | 9/2019 | Ginetti | G06F 30/392 |
| 2011/0041111 A1 * | 2/2011 | Gao | G06F 30/394 716/130 |

* cited by examiner

*Primary Examiner* — Eric D Lee
(74) *Attorney, Agent, or Firm* — Mark H. Whittenberger; Holland & Knight LLP

(57) ABSTRACT

Embodiments include herein are directed towards a method for electronic circuit design is provided. Embodiments may include allowing, at a graphical user interface, a user to initiate a co-design mode associated with an electronic design. Embodiments may further include allowing, at the GUI, the user to select a shape to trace connectivity from. Embodiments may also include tracing the connectivity of the shape across one or more overlaps and identifying one or more pins associated with the connectivity. Embodiments may further include determining a correct pin from an instance associated with the connectivity and displaying the connectivity at the GUI.

20 Claims, 19 Drawing Sheets

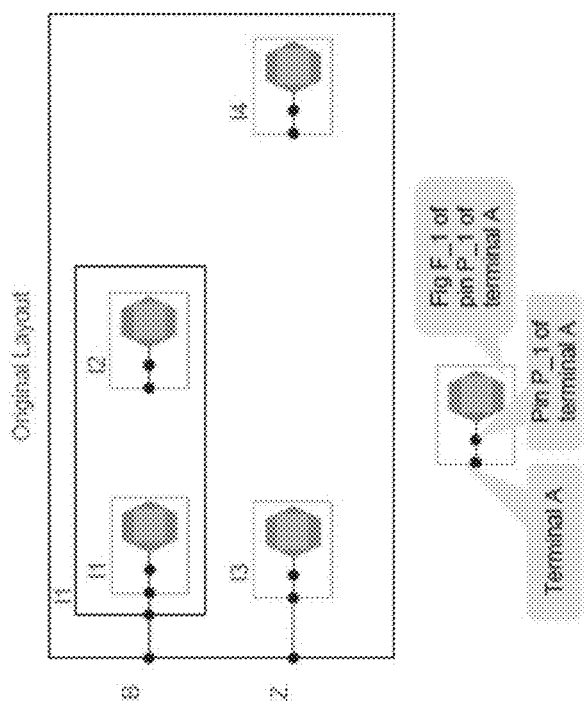
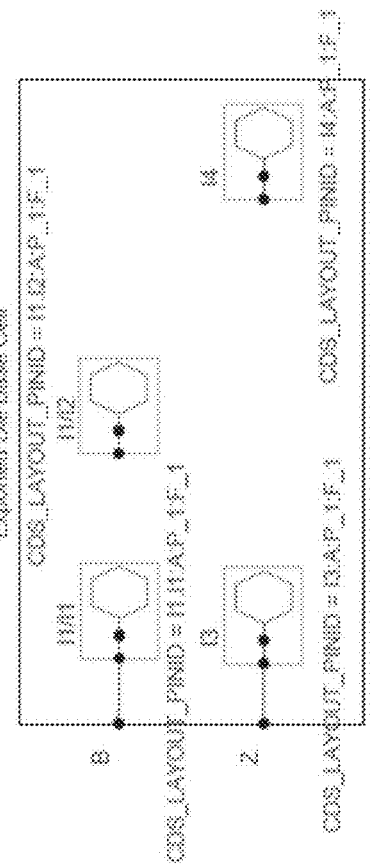
FIG. 4A
FIG. 4B

SYSTEM AND METHOD FOR TRACING NETS ACROSS MULTIPLE FABRICS IN AN ELECTRONIC DESIGN

FIELD OF THE INVENTION

The present disclosure relates to a method of electronic circuit design, and more particularly, to a method of tracing nets across layers in an electronic designs.

BACKGROUND

Electronic design applications exist that support custom analog, digital, and mixed-signal designs at the device, cell, block, and chip levels. Often, these applications may struggle when analyzing multi-fabric designs that span across many design fabrics. A key problem of multi-fabric designs is the lack of any real design hierarchy. Therefore, any cross fabric traversal must always rely on ancillary information stored somewhere. The basic problem is the fact that there typically is not any technology layer commonality between various fabrics. The interconnection is truly external to a known layer stack in any given technology. Using these approaches, tracing a net across various packages and dies is a difficult problem.

SUMMARY

In one or more embodiments of the present disclosure, a computer-implemented method for electronic circuit design is provided. Embodiments may include allowing, at a graphical user interface, a user to initiate a co-design mode associated with an electronic design. Embodiments may further include allowing, at the GUI, the user to select a shape to trace connectivity from. Embodiments may also include tracing the connectivity of the shape across one or more overlaps and identifying one or more pins associated with the connectivity. Embodiments may further include determining a correct pin from an instance associated with the connectivity and displaying the connectivity at the GUI.

One or more of the following features may be included. In some embodiments, determining the correct pin may be based upon, at least in part, at least one linkage stored in a technology independent layout PCell ("TILP"). Displaying may occur in a real layout or package window associated with the GUI. Identifying one or more pins may include identifying all pins on each die instance and package instance. Displaying may include displaying package, top, and die connectivity simultaneously. The method may include analyzing all dies and packages prior to tracing. In co-design mode the method may allow for viewing a multi-fabric design with multiple GUI tabs.

In one or more embodiments of the present disclosure a computer-readable storage medium having stored thereon instructions, which when executed by a processor result in one or more operations is provided. Operations may include allowing, at a graphical user interface, a user to initiate a co-design mode associated with an electronic design. Operations may further include allowing, at the GUI, the user to select a shape to trace connectivity from. Operations may also include tracing the connectivity of the shape across one or more overlaps and identifying one or more pins associated with the connectivity. Operations may further include determining a correct pin from an instance associated with the connectivity and displaying the connectivity at the GUI.

One or more of the following features may be included. In some embodiments, determining the correct pin may be based upon, at least in part, at least one linkage stored in a technology independent layout PCell ("TILP"). Displaying may occur in a real layout or package window associated with the GUI. Identifying one or more pins may include identifying all pins on each die instance and package instance. Displaying may include displaying package, top, and die connectivity simultaneously. Operations may include analyzing all dies and packages prior to tracing. In co-design mode the method may allow for viewing a multi-fabric design with multiple GUI tabs.

In one or more embodiments of the present disclosure, a system is provided. The system may include a computing device having at least one processor configured to allow, at a graphical user interface, a user to initiate a co-design mode associated with an electronic design. The at least one processor may be further configured to allow, at the GUI, the user to select a shape to trace connectivity from. The at least one processor may be further configured to trace the connectivity of the shape across one or more overlaps and to identify one or more pins associated with the connectivity. The at least one processor may be further configured to determine a correct pin from an instance associated with the connectivity and to display the connectivity at the GUI.

One or more of the following features may be included. In some embodiments, determining the correct pin may be based upon, at least in part, at least one linkage stored in a technology independent layout PCell ("TILP"). Displaying may occur in a real layout or package window associated with the GUI. Identifying one or more pins may include identifying all pins on each die instance and package instance. Displaying may include displaying package, top, and die connectivity simultaneously. The at least one processor may be configured to analyze all dies and packages prior to tracing.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 4A is a diagram showing pin mapping in the original layout according to an embodiment of the present disclosure;

FIG. 4B is a diagram showing pin mapping of an exported die base cell according to an embodiment of the present disclosure;

DETAILED DESCRIPTION

Figure 1:
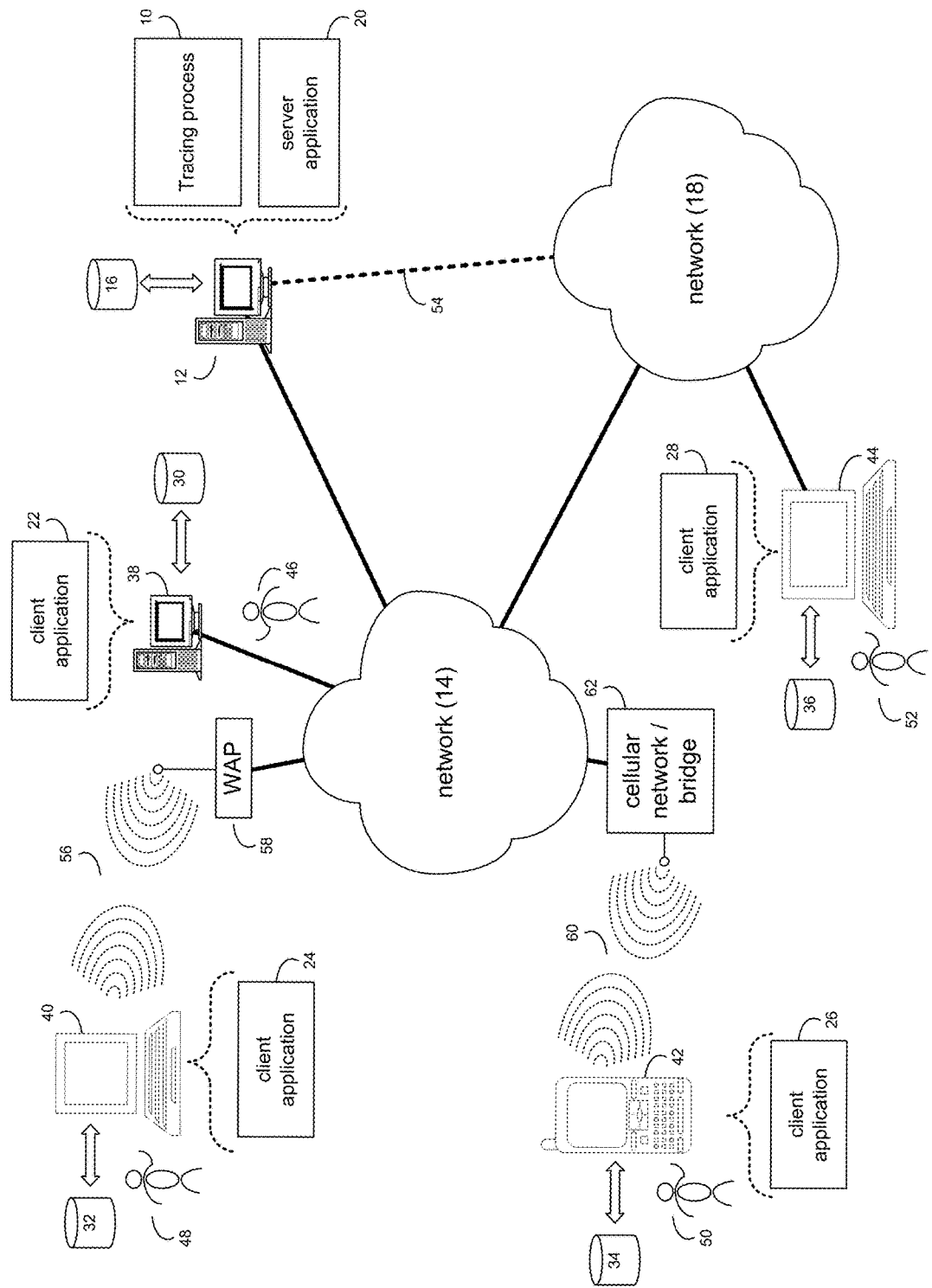
FIG. 1 diagrammatically depicts a tracing process coupled to a distributed computing network.

Embodiments of the present disclosure are directed towards a tracing process that may trace a net across multiple fabrics in an electronic design. In some embodiments, the tracing process described herein may provide the ability to trace nets across a particular hierarchy by analyzing the overlap of physical shapes. This net tracing functionality may be extended to multiple fabric designs. The phrase "multi-fabric design", as used herein, may refer to a design that spans multiple technology fabrics, integrated circuits, packages, etc. that house more than one integrated circuit die, and boards which house more than one package are all fabrics (e.g., IC, package, board).

As discussed above, a key problem of multi-fabric designs is the lack of any real design hierarchy. The design hierarchy may be simulated by usage of Technology Independent Layout Parameterized Cell ("pcell") (TILP) instances which abstract away the technology differences between technologies. A TILP uses an abstract view of a layout and a layer map and may re-layer the connecting pads to the layers in the target fabric (e.g., a package). The term "cell", as used herein, may refer to a unit of a circuit block. The term "pcell", as used herein, may refer to a programmatic construct that may draw its contents based on the values of parameters thus obviating the need to create multiple cells that correspond to different values of parameters.

As used herein, the term "technology" may refer to a collection of layer definitions, the ordering of the layers and various rules governing drawing shapes on the layers. There are a number of technologies available in a given manufacturing company. Usually the technology denotes the minimum dimension for drawing shapes on layers.

As used herein, the term "fabric" may denote a specific type of physical product. For silicon based Integrated Circuits as IC fabric. However, ICs (each unit IC is also called a die) are usually not directly usable. One or multiple ICs have to be put inside a plastic package with physical pins. This is the "Package" fabric. In a real electronic system, such packages are placed on another substrate and wired together. This is the "Board" fabric. The Boards usually end up being used in a real electronic system.

Accordingly, embodiments of the present disclosure provide an innovative way to use the linkage information of pins and real designs from a TILP to continue tracing across fabric boundaries. Embodiments included herein also provide a mechanism for displaying such a trace, by employing multiple scratch cellviews for storing technology specific trace shapes and appropriately transforming the result in a top package view to see the full trace across fabrics.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings may denote like elements.

Referring to FIG. 1, there is shown a tracing process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, tracing process 10 may reside on a client electronic device, such as a personal computer, notebook computer, personal digital assistant, or the like.

The instruction sets and subroutines of tracing process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute tracing process 10. Examples of client applications 22, 24, 26, 28 may include, but are not limited to, design verification tools such as those available from the assignee of the present disclosure. These applications may also be executed by server computer 12. In some embodiments, tracing process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the tracing process may be a client-side application (not shown) residing on one or more client electronic devices 38, 40, 42, 44 (e.g., stored on storage devices 30, 32, 34, 36, respectively). As such, the routing process may be a stand-alone application that interfaces with a client application (e.g., client applications 22, 24, 26, 28), or may be an applet/application that is executed within a client application. As such, the tracing process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, tracing process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Figure 2:
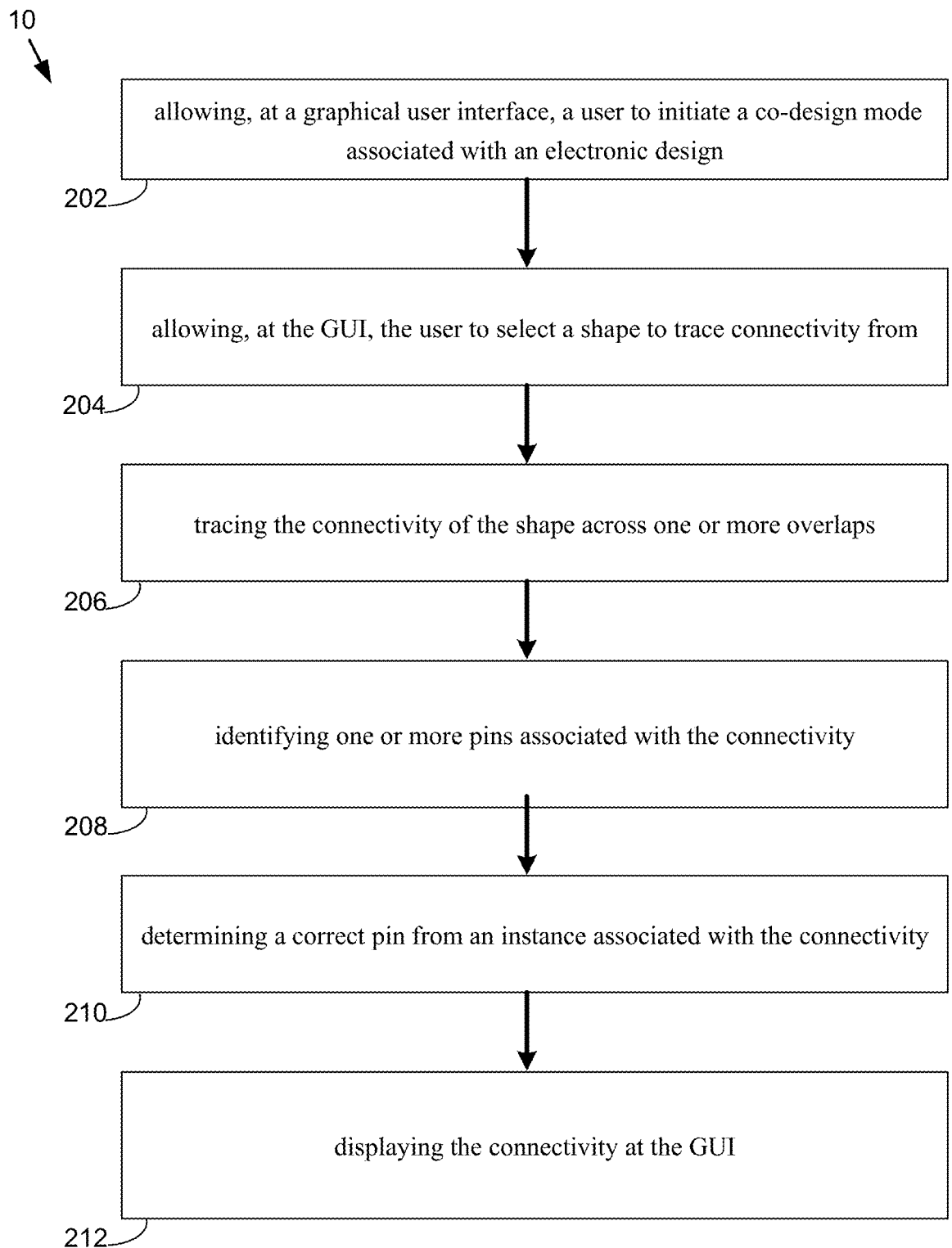
FIG. 2 is an exemplary flowchart of a tracing process according to an embodiment of the present disclosure.

Referring now to FIG. 2, a flowchart depicting an embodiment consistent with tracing process 10 is provided. The method included herein may include allowing 202, at a graphical user interface, a user to initiate a co-design mode associated with an electronic design. Embodiments may further include allowing 204, at the GUI, the user to select a shape to trace connectivity from. Embodiments may also include tracing 206 the connectivity of the shape across one or more overlaps and identifying 208 one or more pins associated with the connectivity. Embodiments may further include determining 210 a correct pin from an instance associated with the connectivity and displaying 212 the connectivity at the GUI. Numerous additional operations are also within the scope of the present disclosure.

For a connectivity extraction system, two shapes are deemed to be connected if they are on the same layer and the shapes have a common edge or the shapes geometrically overlap, e.g., the union of the shapes is a shape with non-zero area. Tracing connectivity then is a process of starting from an identified shape, and checking for other shapes that are connected. The process continues from the connected shapes found until no more new connected shapes are encountered.

In some embodiments, tracing process 10 may operate in conjunction with one or more electronic design applications and may allow for the tracing of a net by following physical connections through a design hierarchy. In some embodiments, tracing process 10 may utilize technology library information along with constraint groups to understand how layers connect to each other. Some EDA applications provide a powerful capability where multiple dies may be combined with packages to help create complex package level designs. It is often required to trace a connection through such heterogenous fabrics and technologies. However, each die has its own definition of layer interconnections and a unique scheme of simulated hierarchy is used in contrast to a real hierarchy. In this example, a real hierarchy consists of designs instantiated in another design. Such that walking from a top level cell through all of the instances in the cell is a straightforward process. A pin of an instance in the top level cell is the real shape of the pin from the instantiated cell. A simulated hierarchy is where the system draws on a display what appears like a real hierarchy. However, a pin of an instance in the top level cell may not be the real shape of that pin from the real cell of the instance.

In some embodiments, tracing process 10 may determine a layer interconnection stack for each of the technologies and then locate and follow one or more connections across technologies and fabrics. As is discussed in further detail hereinbelow, tracing process 10 may be configured to map pins from the real layout to the abstraction used for packaging. In some embodiments, tracing process 10 may follow this link across multiple fabrics. Tracing process 10 may also provide for the display of the trace across fabrics in all of the constituent windows using a co-design mode as is discussed in further detail hereinbelow.

Figure 3:
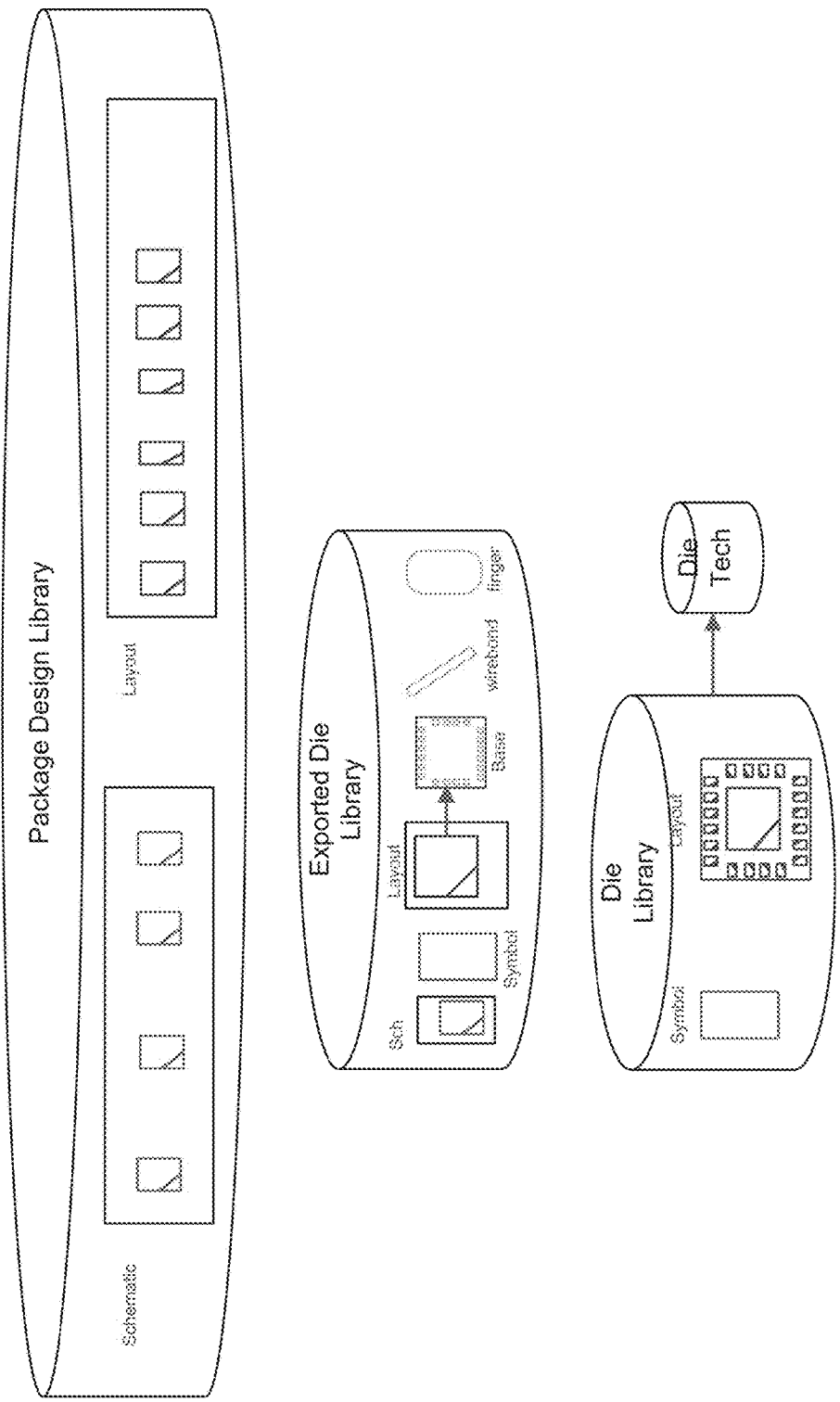
FIG. 3 is a diagram showing various libraries associated with a tracing process according to an embodiment of the present disclosure.

Referring now to FIG. 3, a diagram 300 showing an example consistent with embodiments of tracing process 10 is provided. This example shows one possible arrangement of libraries that may be used with tracing process 10. Some libraries may include, but are not limited to, package design libraries, exported die libraries, die libraries, etc. A die library may include front/back end views (e.g., views of the die (IC) from front (metals on top, substrate at bottom) or back (substrate on top, metals at bottom)) and may have I/O cells (e.g., special circuits used to connect ICs to external pins) of coverBump/pad (e.g., the mechanisms or "landing sites" for external connections/wires from packages to the die) for pads and/or I/O cells must have pin figures ("pinFigs"). An exported die library may include a generic padstack and an exported die, which may include an abstract version of the die that contains pins (pads) and overall size and location of the pins and the die as well as fingers and wirebonds that are the mechanism to connect external package/other dies to this die). It may further include a Technology Independent Layout Pcell (TILP) that may instantiate and re-layer shapes on package layers. A package level design library may include schematics and layouts and may be configured to instantiate one or more exported die TILPs. The hierarchy within a package is "virtual" and not real.

Referring now to FIGS. 4A-4B, an diagram 400 showing an example of pin mapping in an exported die is provided. FIG. 4A shows the original layout and FIG. 4B shows an exported die base cell. In some embodiments, co-design and layout vs. layout (a mechanism to determine whether two layouts or ICs are similar) may utilize mapping information in between the original layout and an exported die base cell. This may be performed by decorating a padStack instance with some CDS_LAYOUT_PINID string property storing. The value of the property helps locate the figure in the real layout cell. The value may include hierarchical references starting from the name of the instance at the highest level going down to the name of the instance that contains the pin. This may include the name of the terminal, the name of the pin and the name of the figure for the pin.

Figure 5:
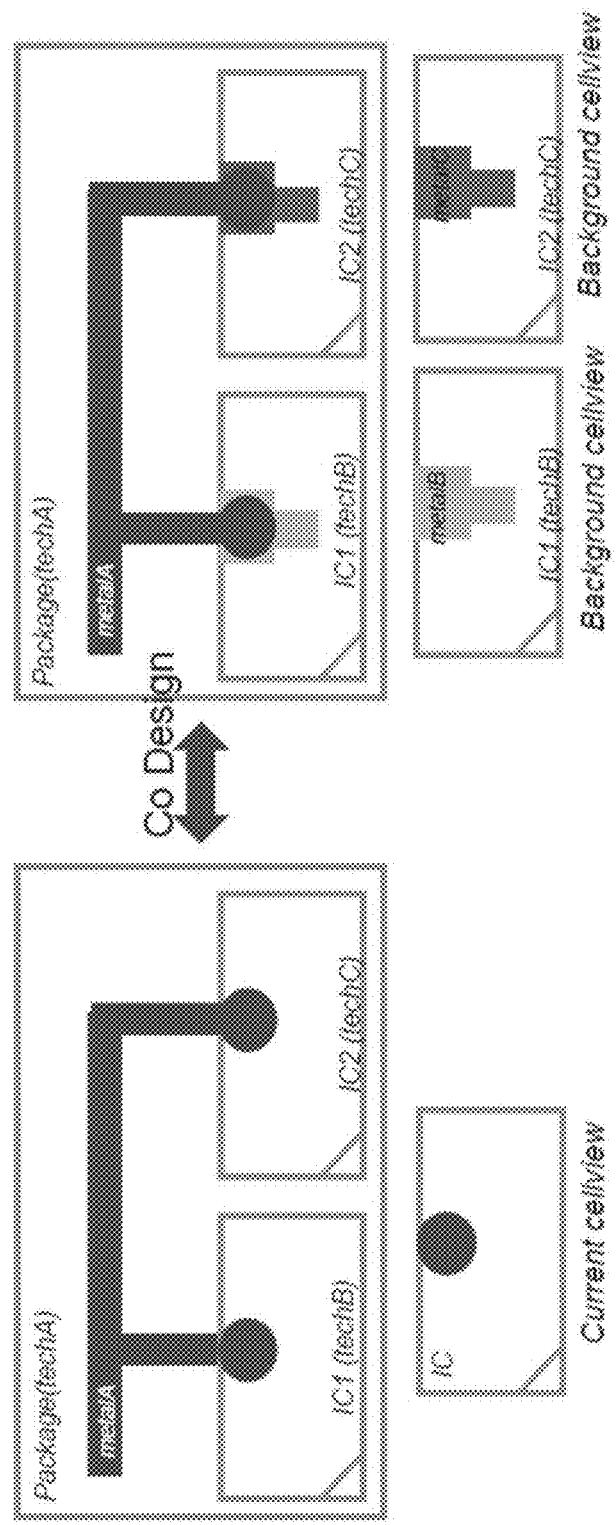
FIG. 5 is a diagram showing an example of a co-design mode according to an embodiment of the present disclosure.

Referring now to FIG. 5, an embodiment showing an example of a co-design mode associated with embodiments of the present disclosure is provided. As used herein, the phrase "co-design mode" may refer to a mechanism for viewing a multi-fabric design using multiple tabs or windows. In operation, this mode may be initiated from a top level multi-fabric design. Each of the dies or packages may be opened in their own tabs in the same session window. A tab may display the primary design in the foreground and the rest of the design may be displayed as a dimmed background view.

Figure 6:
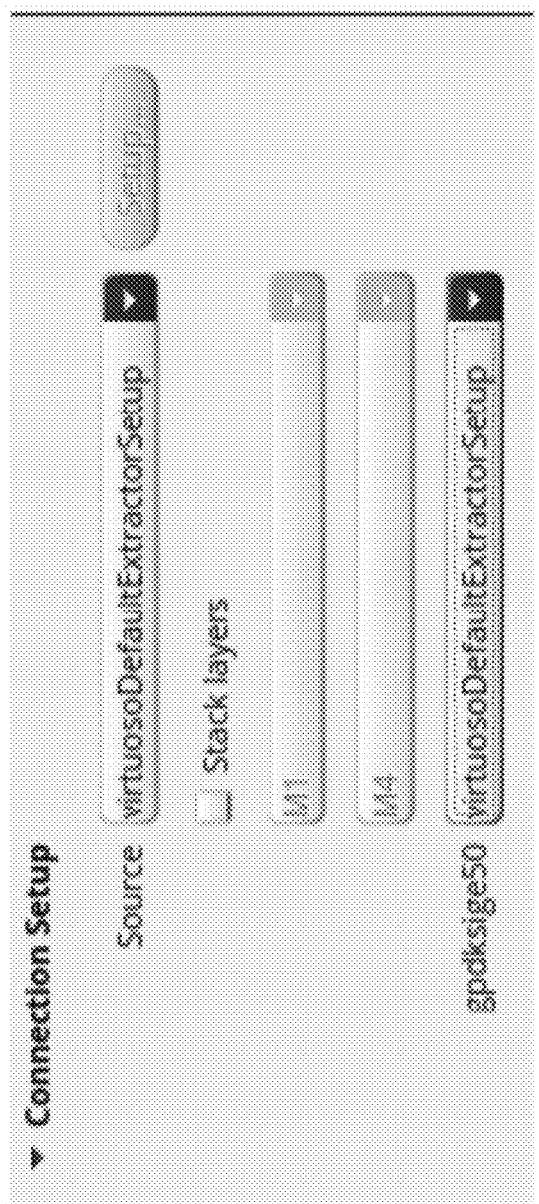
FIG. 6 is a graphical user interface according to an embodiment of the present disclosure.

Referring now to FIG. 6, an embodiment showing an example graphical user interface 600 is provided. In operation, a user may be given the option of initiating the co-design mode. The next operation includes locating and analyzing some or all of the dies and packages in the co-design mode. For each die/package tracing process 10 may allow for the specification of a constraint group that describes the interconnections for that technology. The constraint groups are a specification of layers in that technology and how the layers are connected to each other. Each technology may need a constraint group to be specified.

In some embodiments, tracing process 10 may locate and follow connections across various technologies and fabrics. Once the co-design mode has been initiated tracing process may allow the user to specify a shape to trace connectivity from. Tracing process 10 may trace connectivity in that design/technology using physical shape traversal via overlaps while making a note of all the pins on die/package instances. For all of the connections on a die/package instance, tracing process 10 may locate the real design and identify the real pin using linkages stored in the TILP. Tracing process 10 may continue tracing in the real layout/package window in the corresponding tab during the co-design mode. The process may weave in and out of designs based on connectivity. In prior systems, the challenges in tracing arise because the multi-fabric design hierarchy is not a true hierarchy. Accordingly, embodiments included herein may be configured to locate the correct pin/design from an instance in the package.

Figure 7:
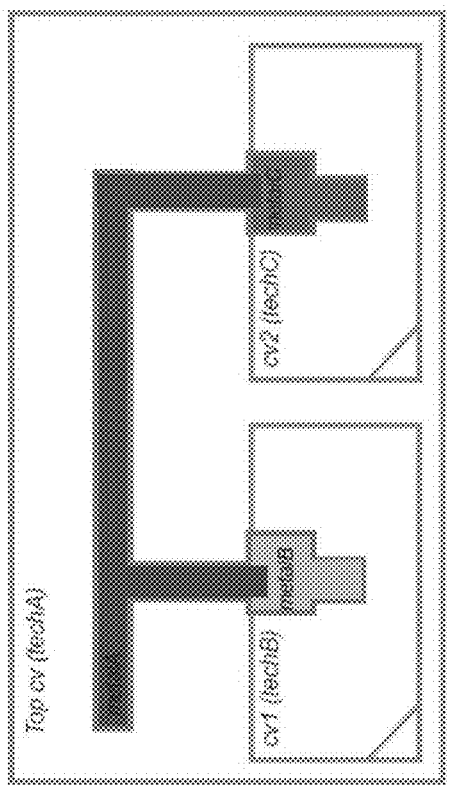
FIG. 7 is a diagram showing an example according to an embodiment of the present disclosure.
Figure 7:
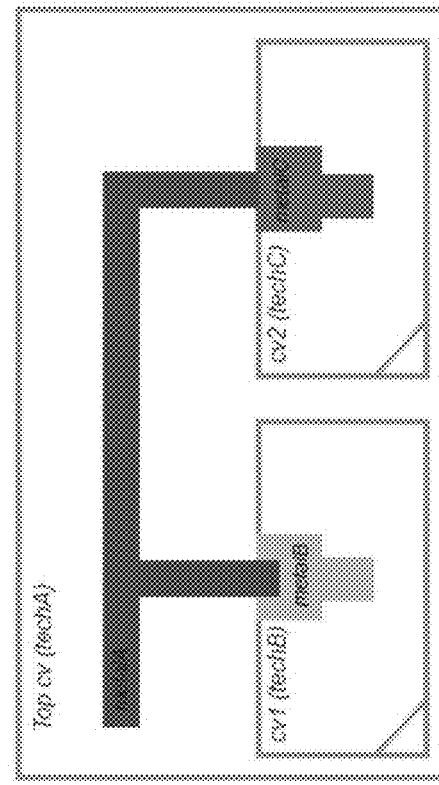

Referring also to FIG. 7, an embodiment showing an example of locating and following connections across technologies and fabrics is provided. FIG. 7 shows the result of tracing metalA in top design called cv (techA). Tracing in cv yields pins for TILP instances representing designs IC dies cv 1 and cv2. The stored linkage may allow for retrieval of design cv1 and the pin metalB and design cv2 with metalC pin. Then the trace may continue in those.

In some embodiments, tracing process 10 may be configured to display the trace in all of the constituent windows associated with the co-design mode. Tracing process 10 may trace in each of the designs/technologies and generate a temporary design per technology to store the traced shapes. For each of the technology in the co-design tabs, tracing process 10 may display the part of the trace in that design. For example, in the top design tab, the complete traces may be shown spanning across dies and packages. In this way, tracing process 10 allows for the stitching of different data from technologies to a single display for the full trace.

Figure 8:
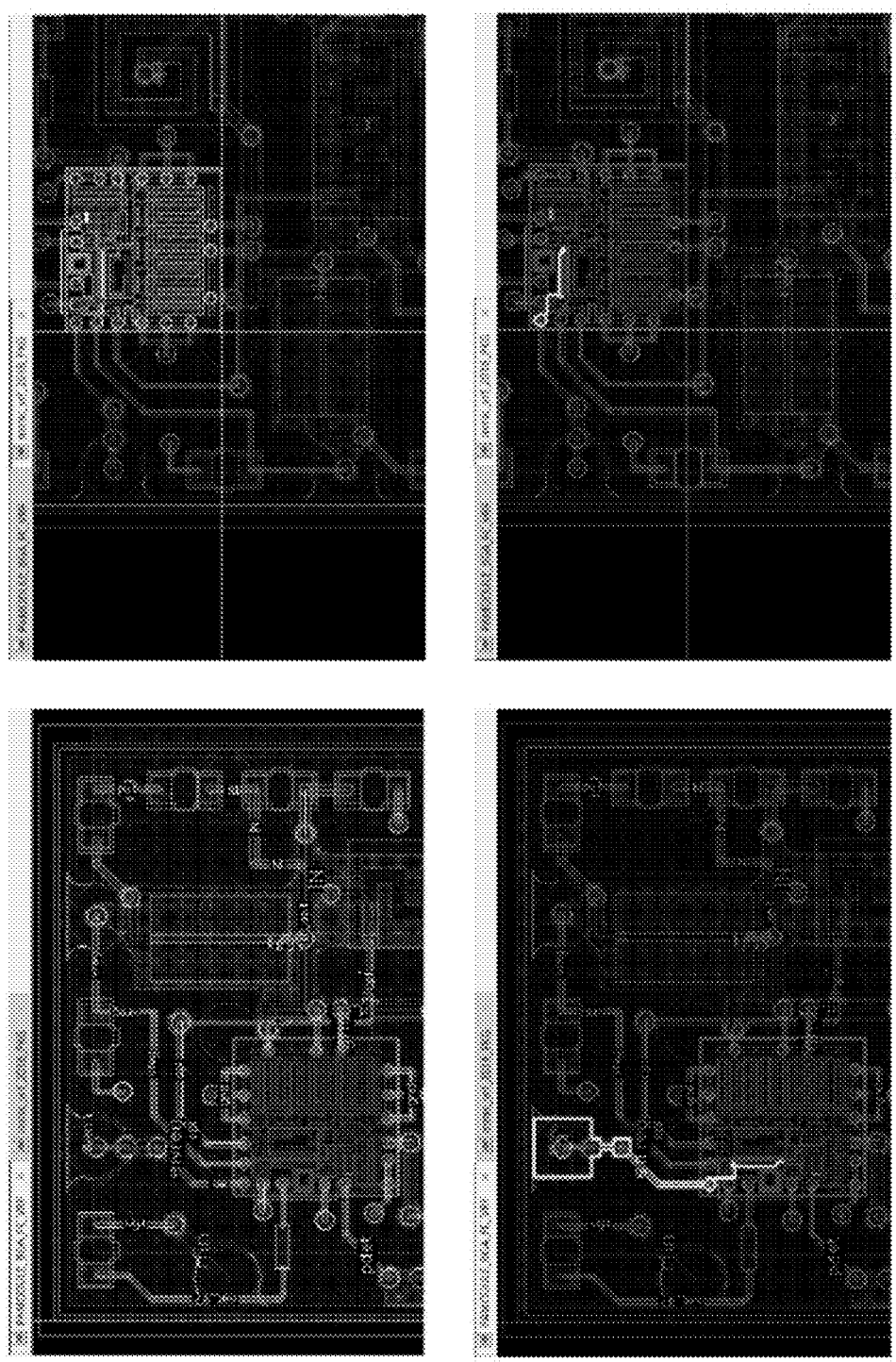
FIG. 8-19 show various graphical user interfaces according to embodiments of the present disclosure.

Referring now to FIG. 8, an embodiment showing a graphical user interface 800 is provided. GUI 800 shows an example where tracing process 10 allows for displaying the trace in all of the constituent windows in co-design mode. In this example, the top level package (shown on the left) with a die (shown on the right) in co-design mode is provided. The bottom two displays show the net traced through the package and the die. The package on the left shows the full display while the die on the right shows only the part in the die. While this example illustrates a die-in-package example, in some embodiments, tracing process 10 may allow for package-in-board traces and other functionalities such as a step by step tracing mode. Step by step tracing mode may allow for GUI control for progressing one step at a time instead of completing the trace in a single operation.

Figure 9:
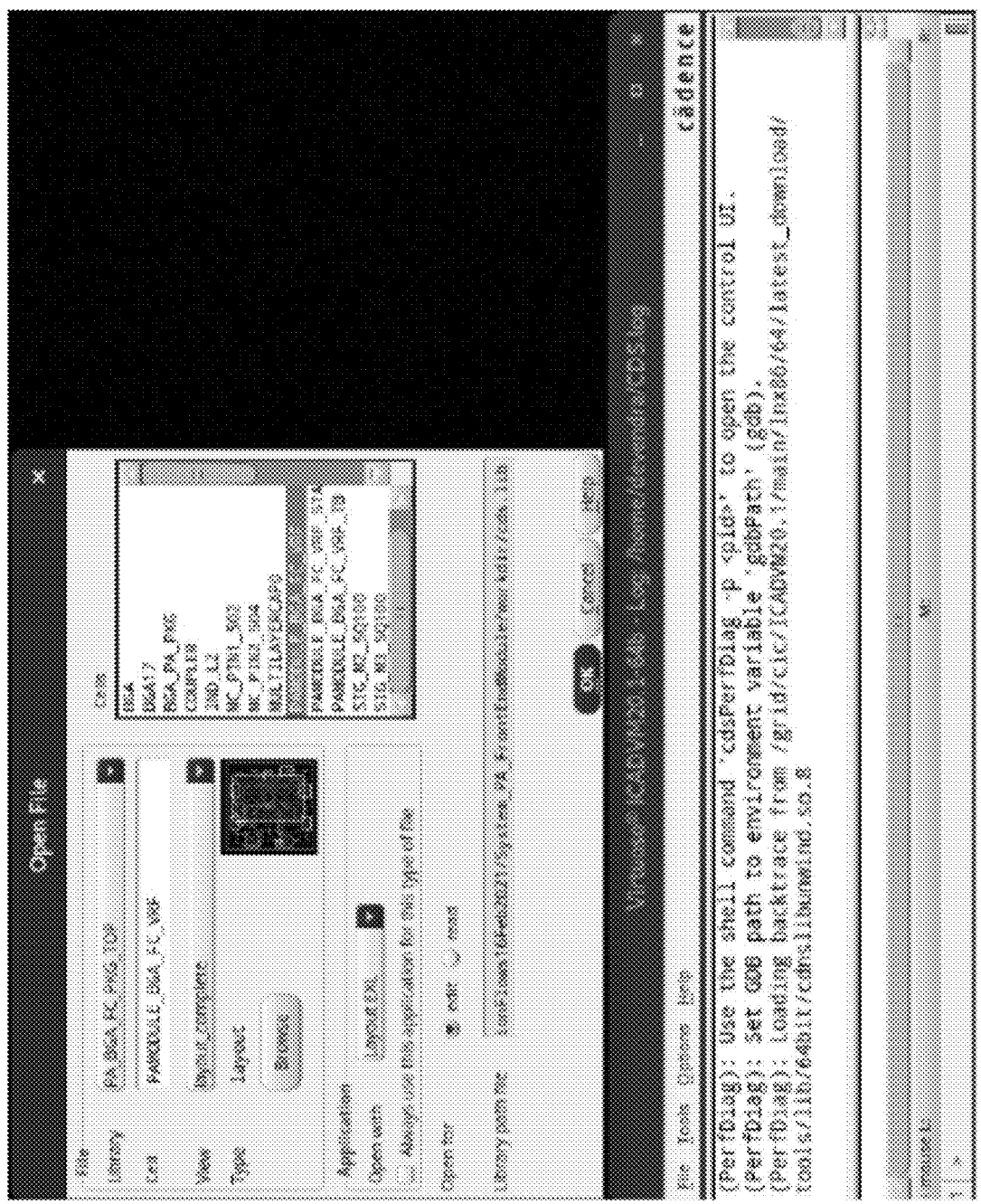
Figure 10:
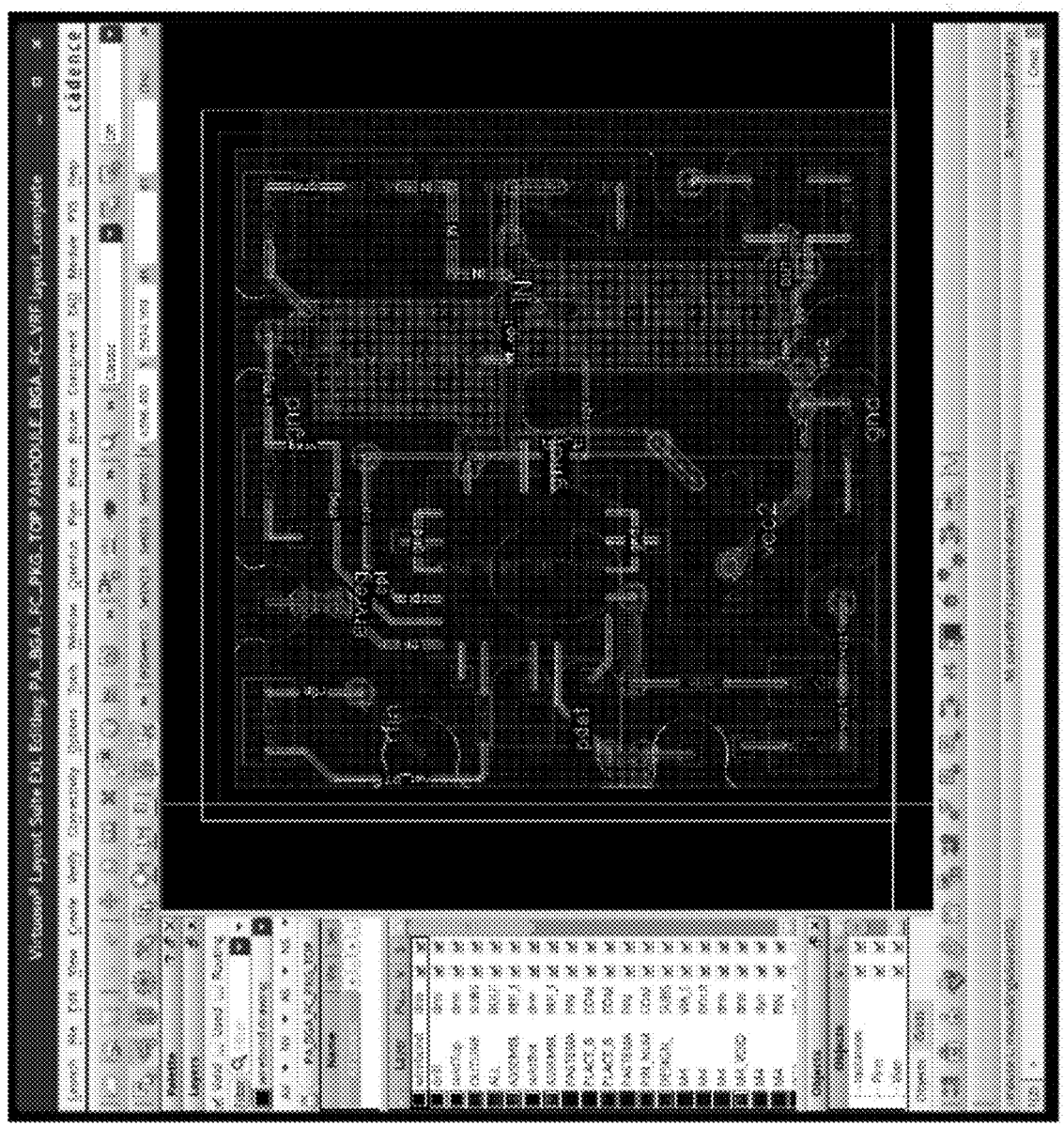

Referring now to FIGS. 9-10, an embodiment showing graphical user interfaces 900 and 1000 are provided. GUI 900 shows an example where a user may open an existing electronic design. In this example, the user may initiate the software using the command line or any suitable approach. The opened electronic design displaying a package is shown in GUI 1000 in FIG. 10.

Figure 11:
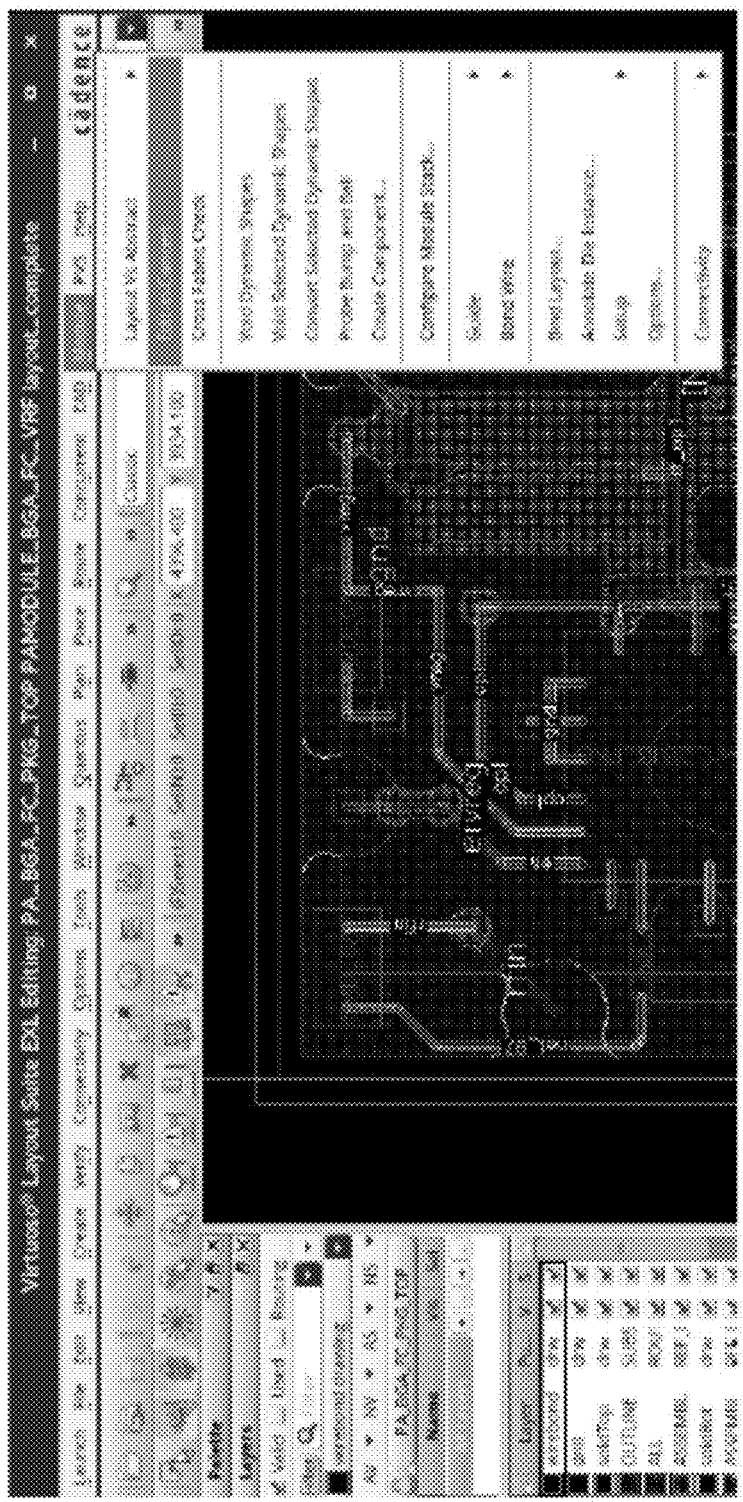
Figure 12:
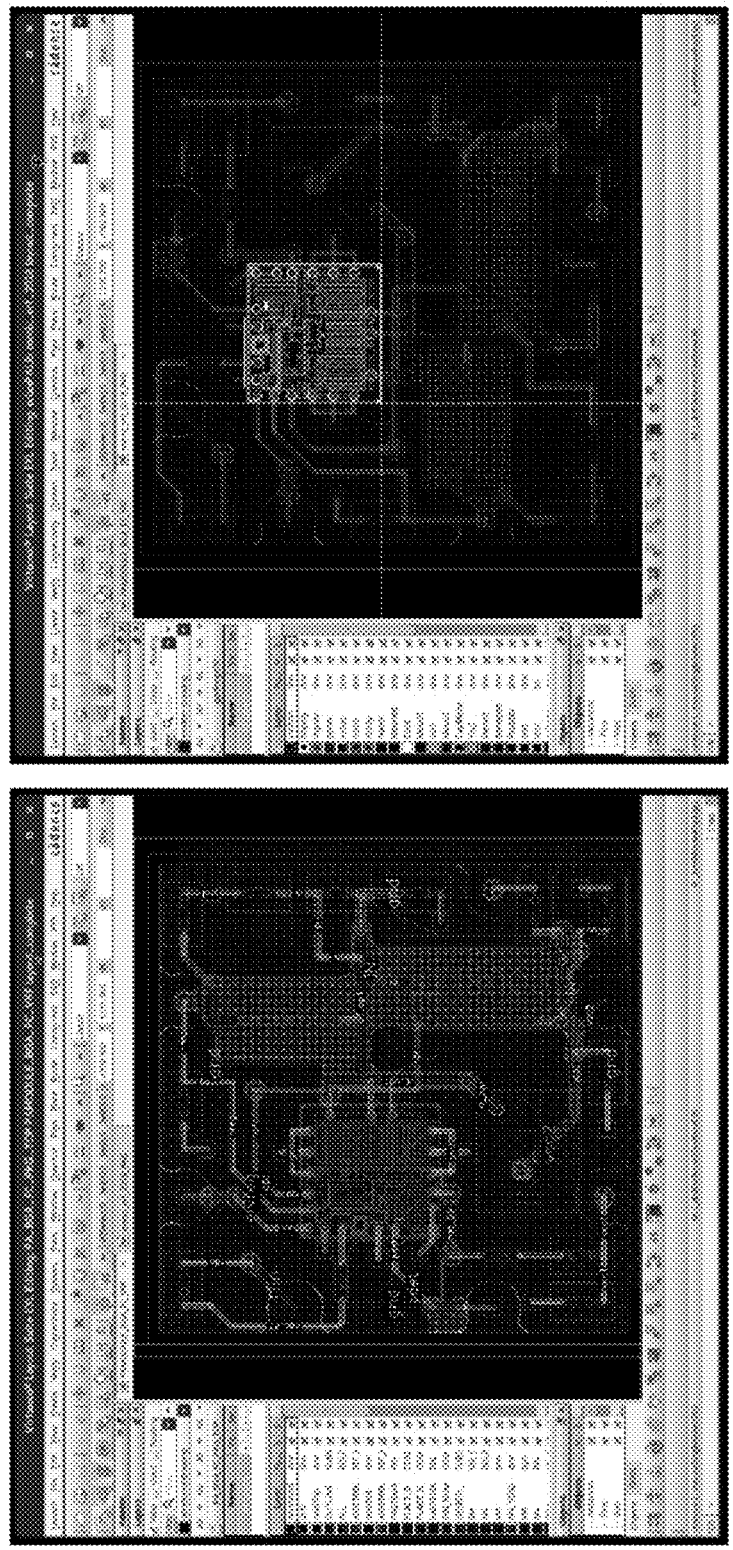

Referring now to FIGS. 11, an embodiment showing graphical user interfaces 1100 and 1200 are provided. GUI 1100 shows an example of an edit-in-concert menu. In some embodiments, tracing process 10 may allow for viewing both the package and the IC in separate tabs in a display window. In this example, the user may select from the "module" drop down window the "edit-in-concert" option. Invoking edit-in-concert may generate the display of two windows or tabs as shown in FIG. 12. The first window continues to show the package while the second window may show the IC in a layout view. In some embodiments, the IC may be rotated and/or flipped as necessary and as depicted in FIG. 12.

Figure 13:
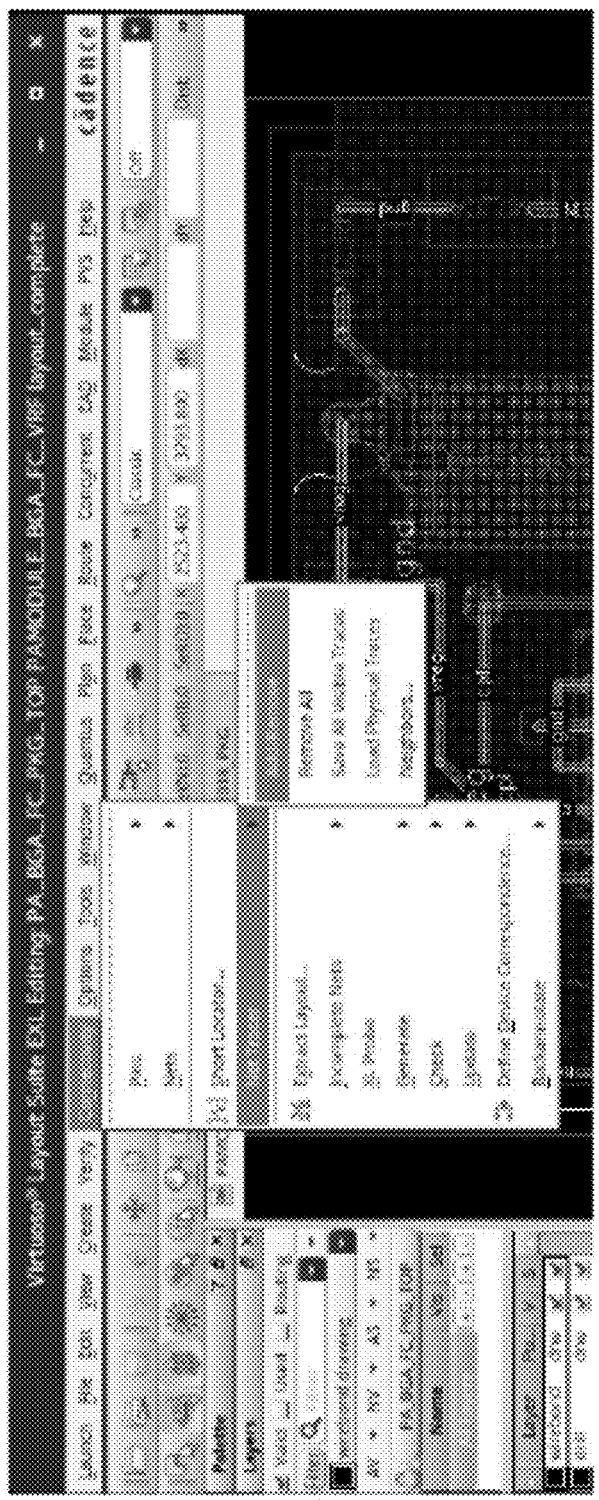
Figure 14:
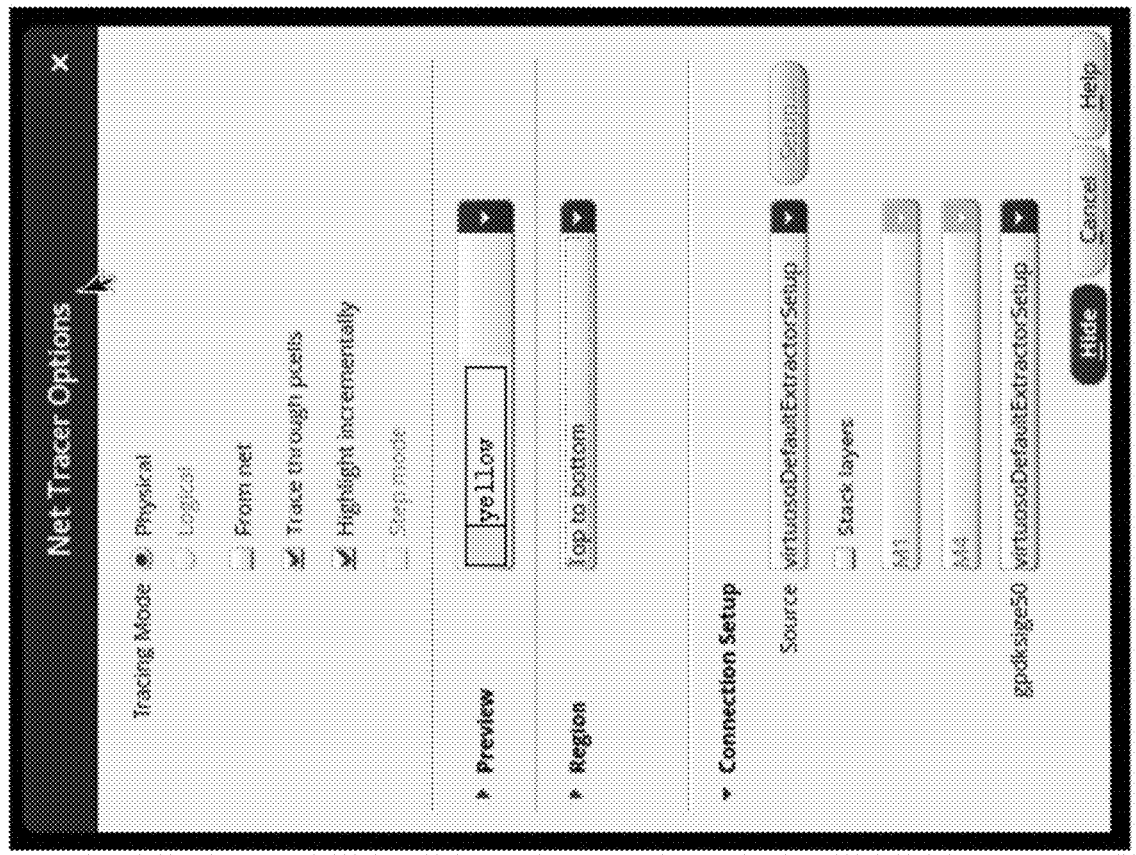

Referring now to FIGS. 13-14, an embodiment showing graphical user interfaces 1300 and 1400 are provided. GUI 1300 shows an example of a net tracer menu for package. In order to trace a net across a package and IC, the user may invoke the net tracer from the connectivity menu and then select the add/remove option. The net tracer option provides for a connection setup for multiple technologies as is shown in FIG. 14.

Figure 15:
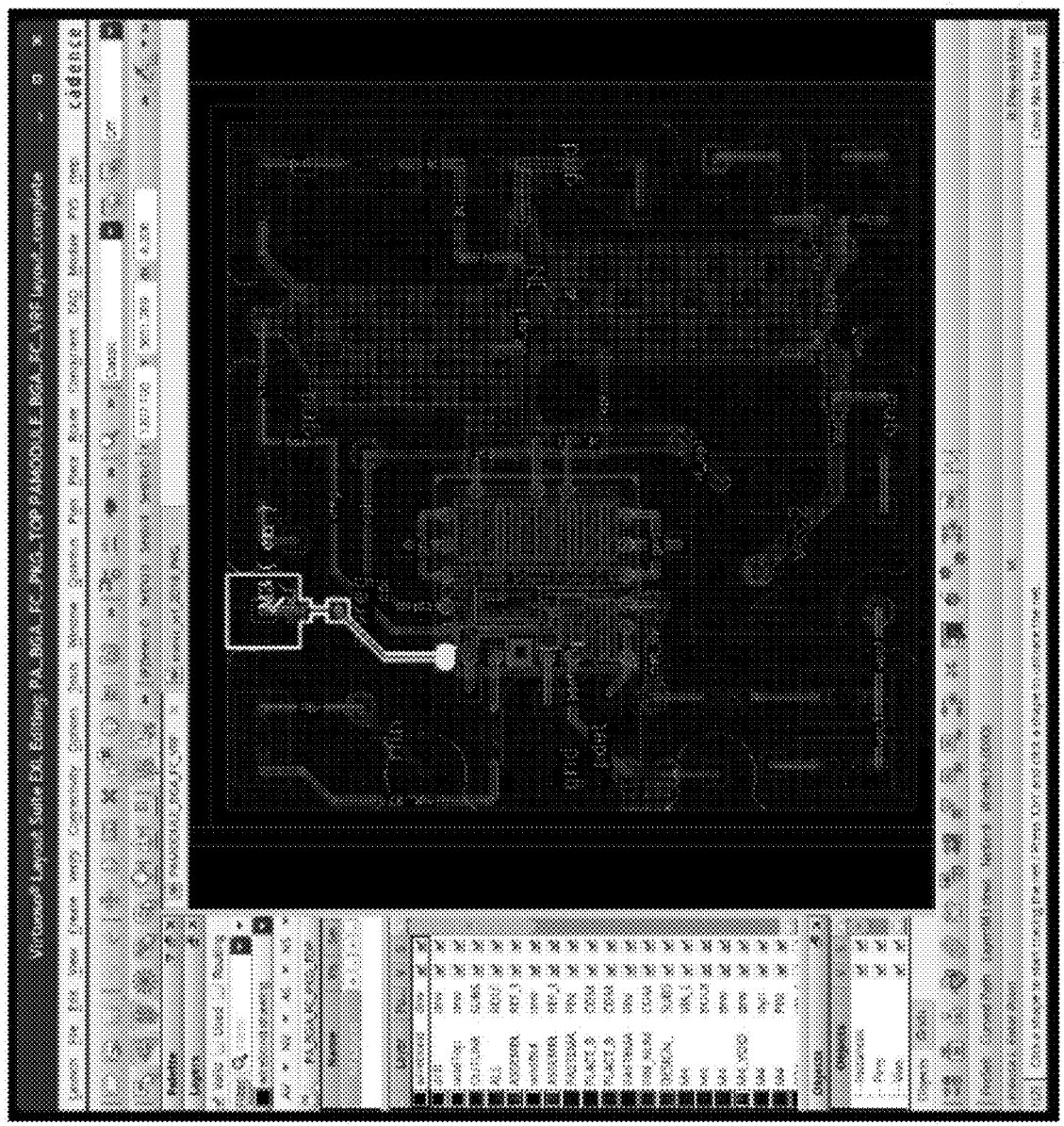
Figure 16:
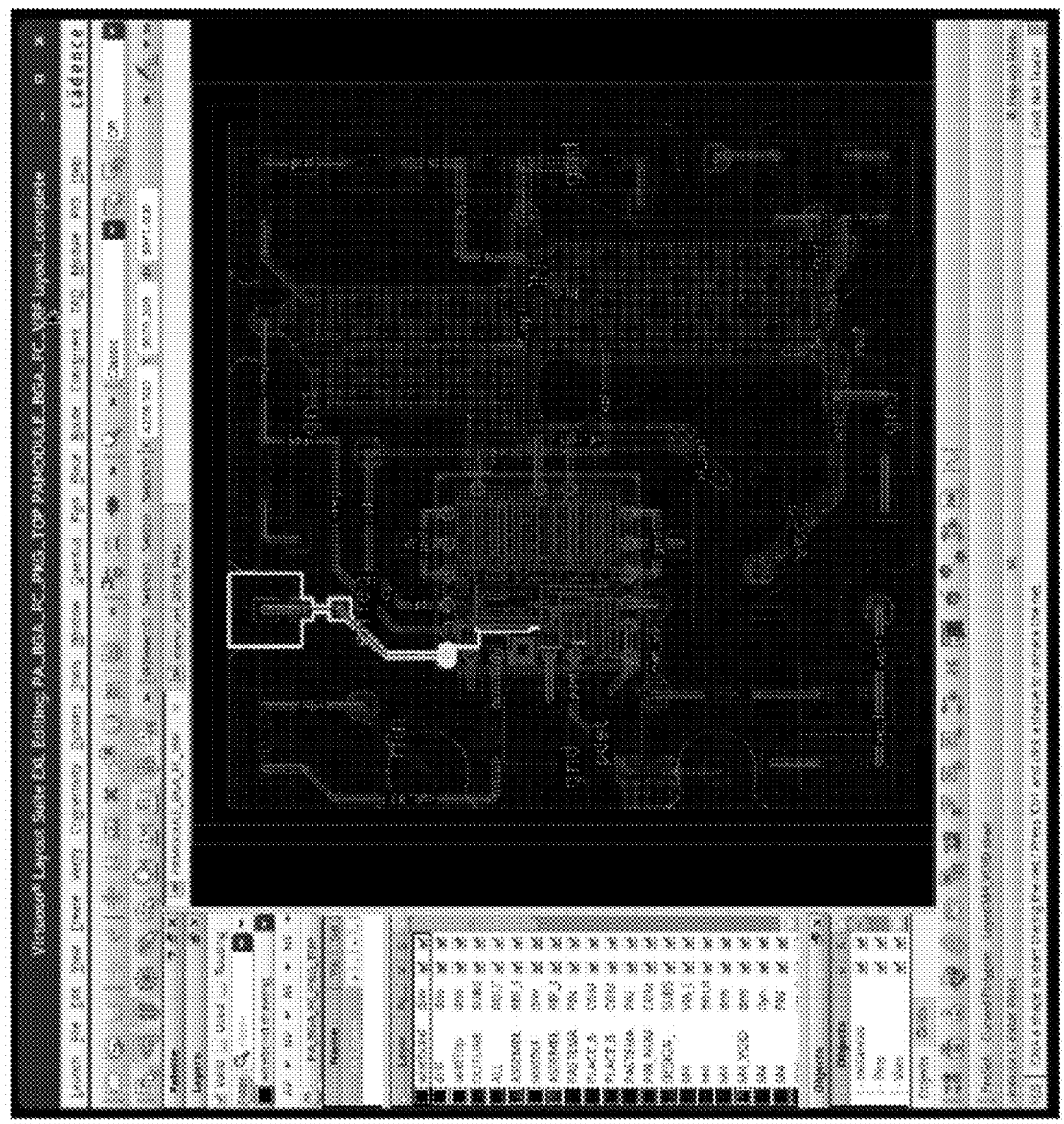
Figure 17:
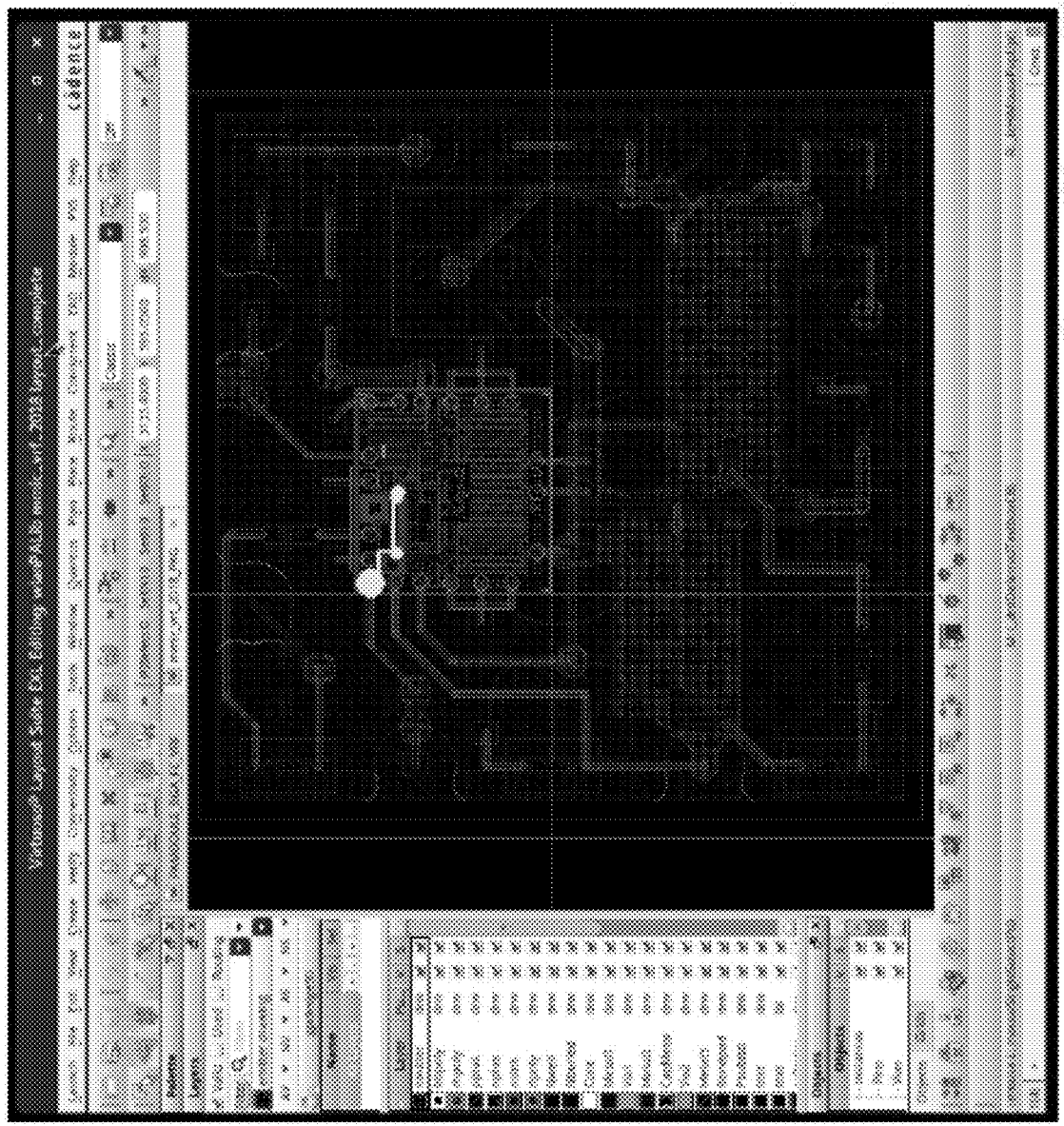
Figure 18:
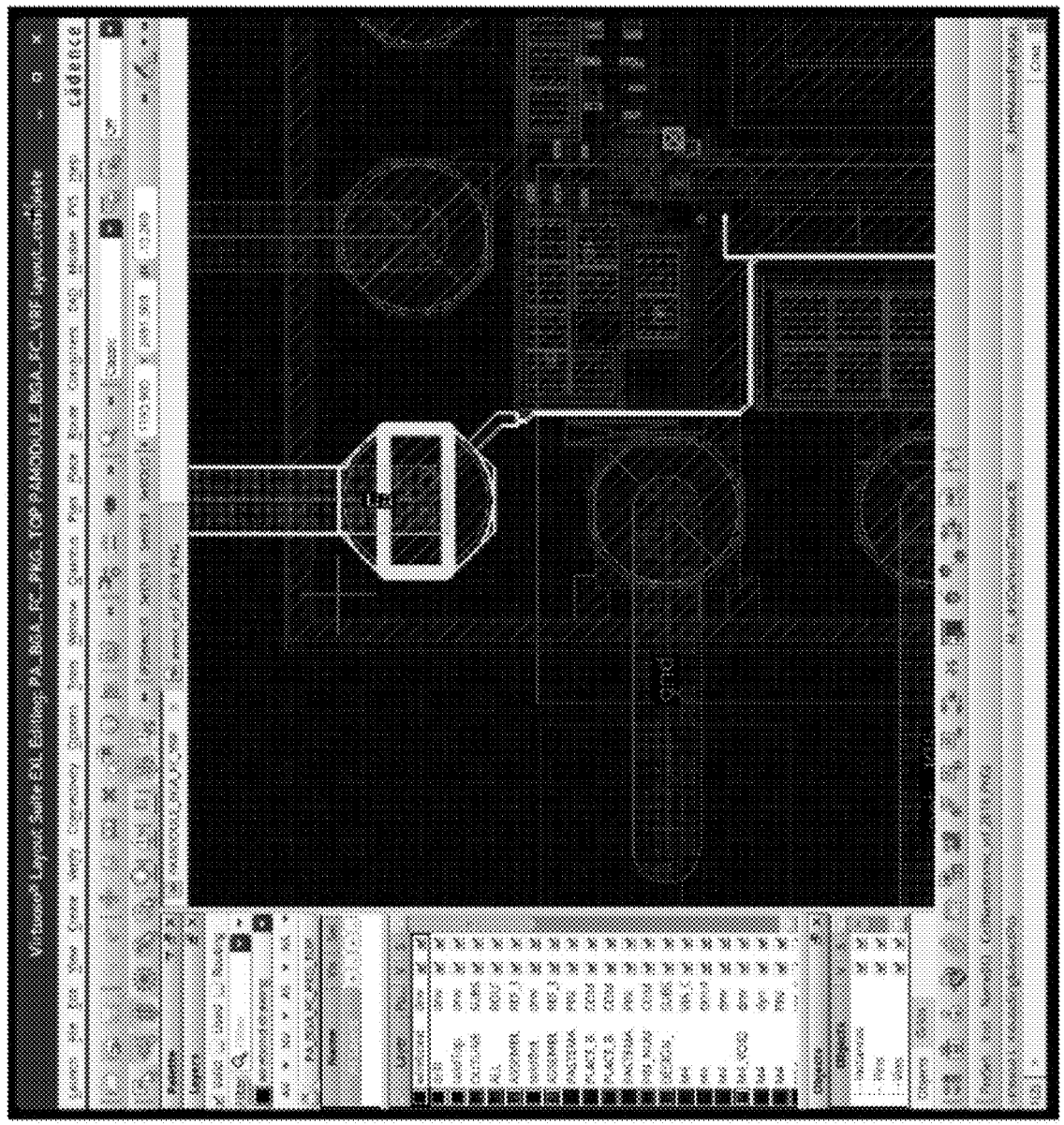
Figure 19:
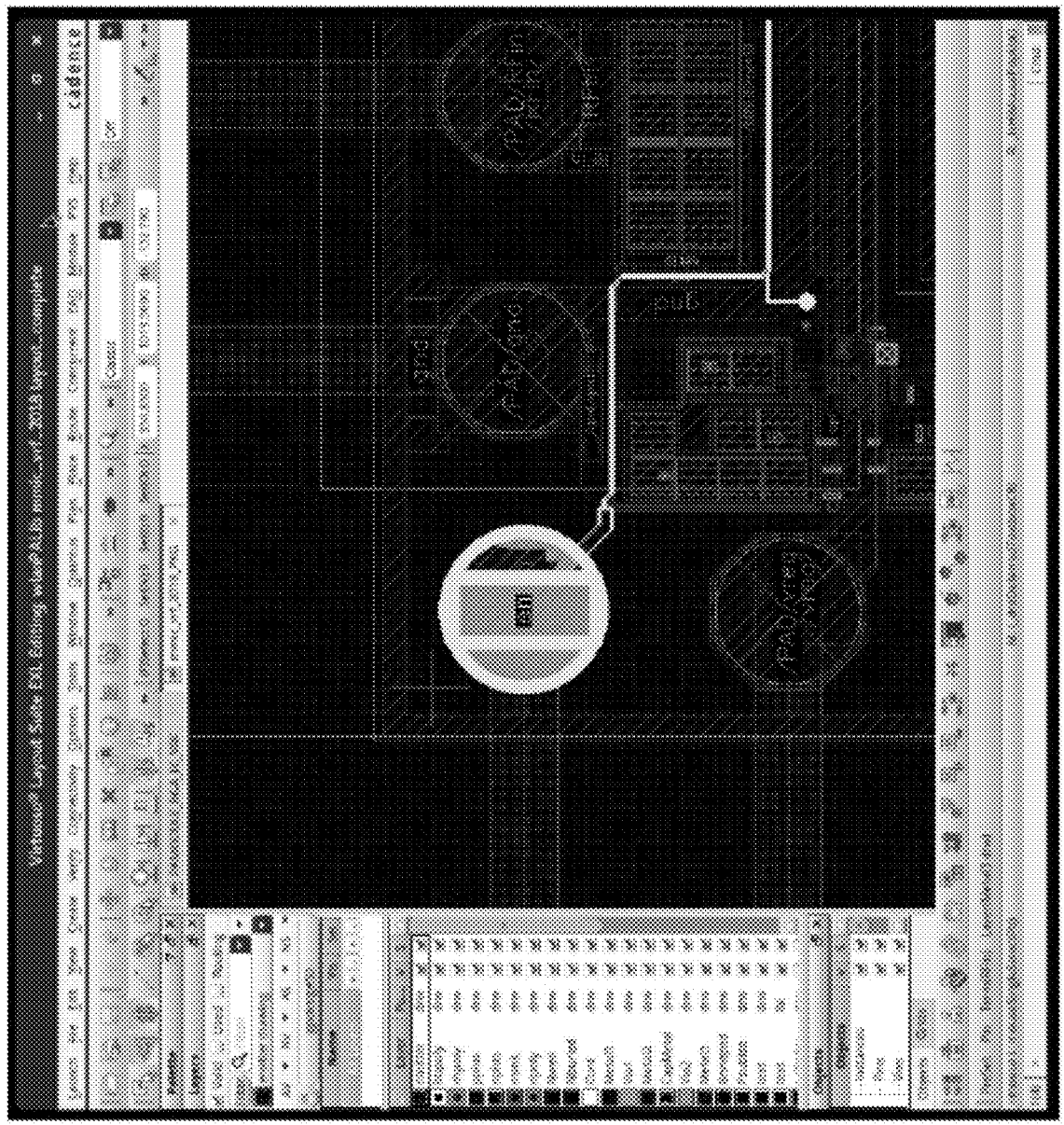

Referring now to FIGS. 15, an embodiment showing graphical user interface 1500 and is provided. GUI 1500 shows an example depicting a net tracing preview display. In operation, once tracing process 10 begins, moving the cursor on the GUI may highlight the nets in the package (e.g., by highlighting on the GUI in various colors (e.g., right, yellow, etc.)). Selecting a shape may start the trace and the completed trace may appear both in the package and IC layout as is shown in FIGS. 16-17. Here, the package is shown in FIG. 16 and the IC layout in FIG. 17. It should be noted that these windows may be displayed simultaneously for the user's convenience. FIGS. 18-19 show a synchronized zooming in and out capability that also helps the user visualize the package and IC for the trace.

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method comprising:
   allowing, at a graphical user interface, a user to initiate a co-design mode associated with an electronic design;
   allowing, at the GUI, the user to select a shape to trace connectivity from;
   tracing the connectivity of the shape across one or more shape overlaps, wherein tracing includes generating a temporary design per technology to store a traced shape;
   identifying one or more pins associated with the connectivity;
   determining a correct pin from an instance associated with the connectivity; and
   displaying the connectivity at the GUI.

2. The computer-implemented method of claim 1, wherein determining the correct pin is based upon, at least in part, at least one linkage stored in a technology independent layout PCell ("TILP").

3. The computer-implemented method of claim 1, wherein displaying occurs in a real layout or package window associated with the GUI.

4. The computer-implemented method of claim 1, wherein identifying one or more pins includes identifying all pins on each die instance and package instance.

5. The computer-implemented method of claim 1, wherein displaying includes displaying package, top, and die connectivity simultaneously.

6. The computer-implemented method of claim 1, further comprising:
   analyzing all dies and packages prior to tracing.

7. The computer-implemented method claim 1, wherein the co-design mode allows for viewing a multi-fabric design with multiple GUI tabs.

8. A non-transitory computer-readable storage medium having stored thereon instructions that when executed by a machine result in the following operations:
   allowing, at a graphical user interface, a user to initiate a co-design mode associated with an electronic design;
   allowing, at the GUI, the user to select a shape to trace connectivity from;
   tracing the connectivity of the shape across one or more shape overlaps, wherein tracing includes generating a temporary design per technology to store a traced shape;
   identifying one or more pins associated with the connectivity;
   determining a correct pin from an instance associated with the connectivity; and
   displaying the connectivity at the GUI.

9. The non-transitory computer-readable storage medium of claim 8, wherein determining the correct pin is based upon, at least in part, at least one linkage stored in a technology independent layout PCell ("TILP").

10. The non-transitory computer-readable storage medium of claim 8, wherein displaying occurs in a real layout or package window associated with the GUI.

11. The non-transitory computer-readable storage medium of claim 8, wherein identifying one or more pins includes identifying all pins on each die instance and package instance.

12. The non-transitory computer-readable storage medium of claim 8, wherein displaying includes displaying package, top, and die connectivity simultaneously.

13. The non-transitory computer-readable storage medium of claim 8, further comprising:
    analyzing all dies and packages prior to tracing.

14. The non-transitory computer-readable storage medium of claim 8, wherein the co-design mode allows for viewing a multi-fabric design with multiple GUI tabs.

15. A system comprising:
    a computing device having at least one processor configured to allow, at a graphical user interface, a user to initiate a co-design mode associated with an electronic design, the at least one processor further configured to allow, at the GUI, the user to select a shape to trace connectivity from, the at least one processor further configured to trace the connectivity of the shape across one or more shape overlaps, wherein tracing includes generating a temporary design per technology to store a traced shape and to identify one or more pins associated with the connectivity, the at least one processor further configured to determine a correct pin from an instance associated with the connectivity and to display the connectivity at the GUI.

16. The system of claim 15, wherein determining the correct pin is based upon, at least in part, at least one linkage stored in a technology independent layout PCell ("TILP").

17. The system of claim 15, wherein displaying occurs in a real layout or package window associated with the GUI.

18. The system of claim 15, wherein identifying one or more pins includes identifying all pins on each die instance and package instance.

19. The system of claim 15, wherein displaying includes displaying package, top, and die connectivity simultaneously.

20. The system of claim 15, further comprising:
    analyzing all dies and packages prior to tracing.

* * * * *